Patented Feb. 17, 1925.

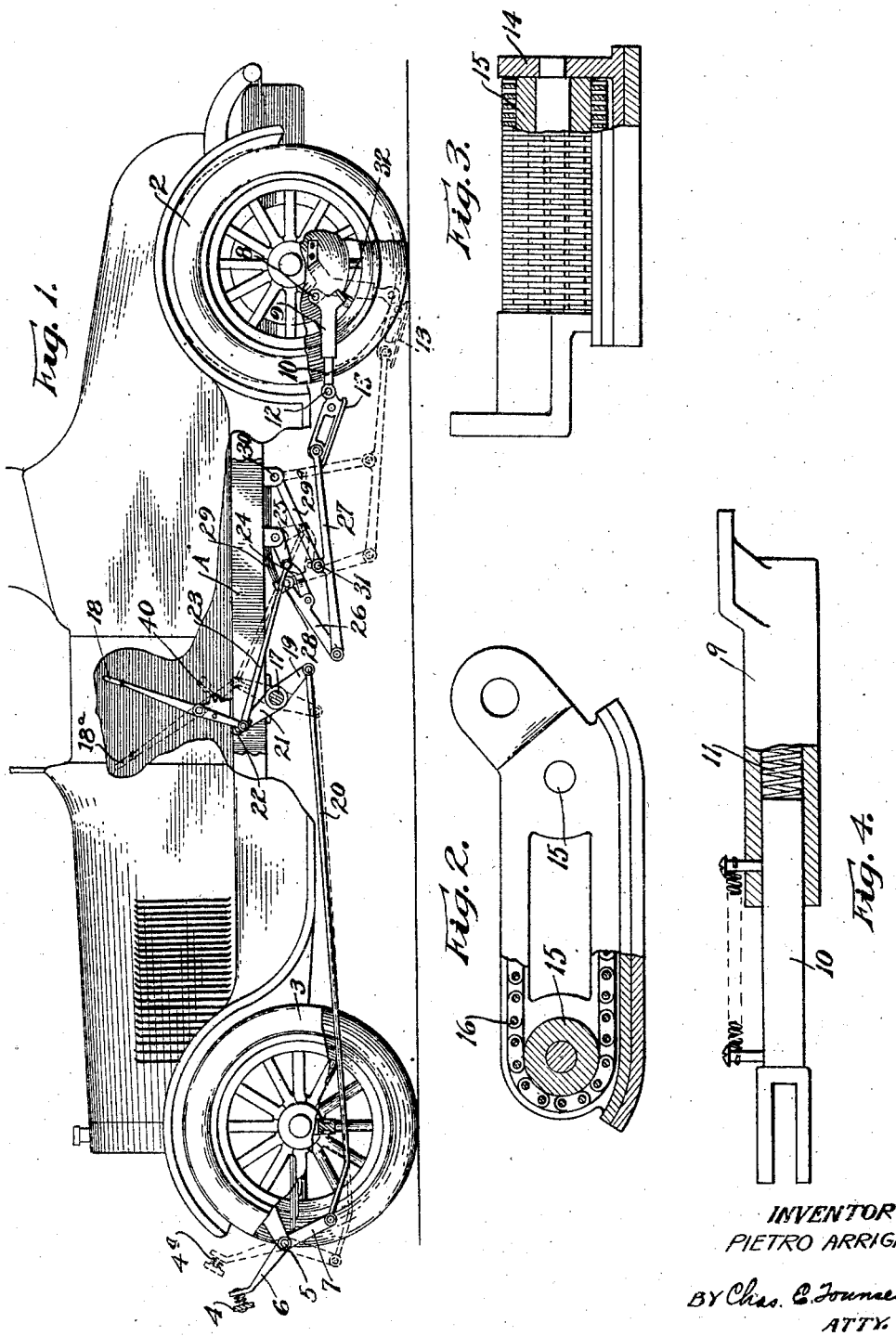

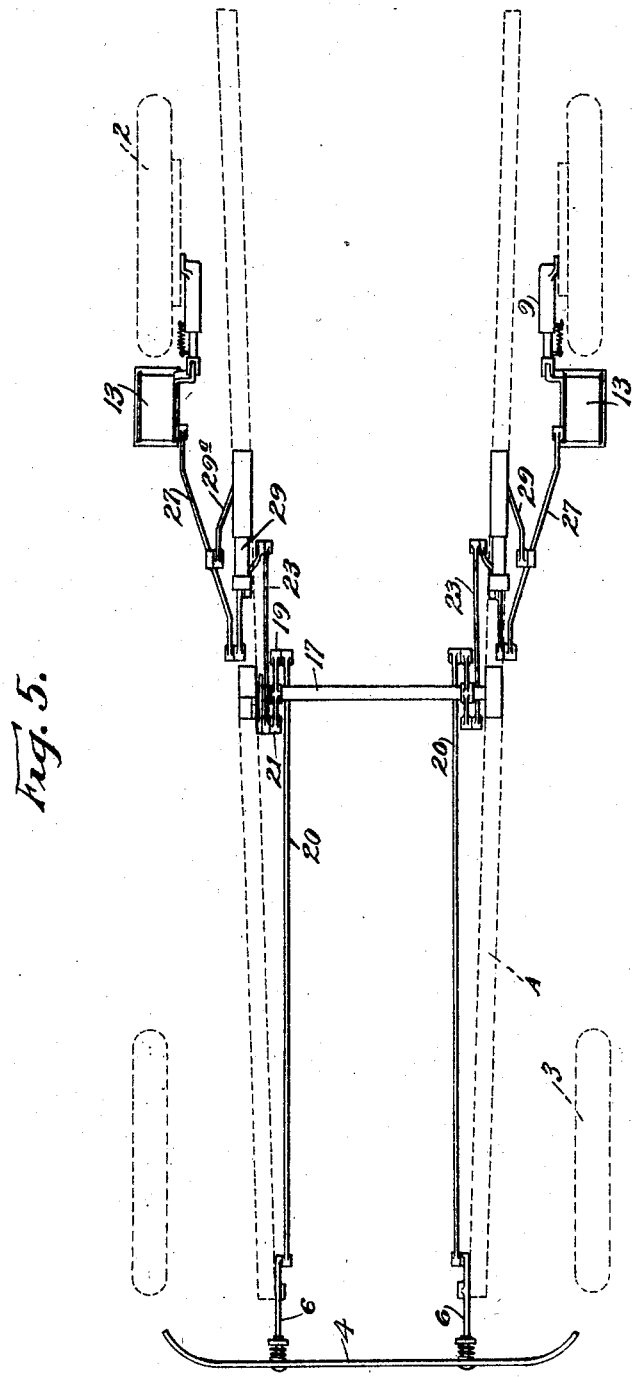

1,526,892

UNITED STATES PATENT OFFICE.

PIETRO ARRIGHI, OF SAN FRANCISCO, CALIFORNIA.

EMERGENCY BRAKE.

Application filed June 15, 1921. Serial No. 477,626.

*To all whom it may concern:*

Be it known that I, PIETRO ARRIGHI, a citizen of the United States, residing at the city and county of San Francisco and State of California, have invented new and useful Improvements in Emergency Brakes, of which the following is a specification.

This invention relates to vehicle brakes and is intended particularly, though not exclusively, for an emergency brake for motor vehicles where occasion frequently arises for quickly arresting the forward movement of the vehicle.

One of the objects of the present invention is to generally improve and simplify brakes of the character described, and especially to provide a brake mechanism which is adapted to act quickly and efficiently in cases of emergency or otherwise and entirely independent of the foot and emergency brakes with which practically all motor vehicles are equipped.

Another object of the invention is to provide an emergency brake, comprising a pair of shoes designed to be carried by the vehicle and to be lowered to the road surface in position for the vehicle driving wheels to run upon the same, so that the wheels instead of skidding on the road will be supported upon the shoes and the frictional grip between the vehicle and the roadway increased to permit quick arrest of the forward movement of the vehicle.

Another object of the invention is to provide an operating mechanism by which the chauffeur, as he sits in his customary place by the steering wheel, may quickly affect either a service application or a release or lowering of the shoes; further to provide a bumper and means actuated thereby for automatically lowering the shoes in cases of accident, etc.

Other objects will hereinafter appear.

The invention consists of the parts and the construction, combination and arrangement of parts as hereinafter more fully described and claimed, having reference to the accompanying drawings, in which—

Fig. 1 is a side elevation of a motor vehicle, showing the application of the invention.

Fig. 2 is a side elevation partially in section, showing one of the brake shoes.

Fig. 3 is a partial end view and cross section of one of the brake shoes.

Fig. 4 is a partial side elevation and section of one of the arms carrying the brake shoes.

Fig. 5 is a plan view of the invention, showing its application to a motor vehicle.

Referring to the drawings in detail, and particularly to Figs. 1 and 2, A indicates the main frame of a motor vehicle, 2 the rear driving wheels, 3 the steering wheels, and 4 the bumper bar disposed in front thereof. The bumper is in this instance carried by a cross shaft 5 and a pair of arms 6. The lower ends of the arms 6 are extended below the shaft 5, upon which they are pivotally mounted and terminate in crank arms 7, the function of which will hereinafter be described. Pivotally secured to the side of each brake drum, as at 8, is a tubular arm 9. Slidably mounted therein and telescoping with relation to each tubular arm is a rod 10, and adapted to normally project the rod 10 is a spring 11; said spring being interposed between the inner end of the rod and the upper end of the tubular arms 9, as shown in Fig. 4. Pivotally mounted on the outer end of each rod 10, as at 12, is a brake shoe 13. Formed on each side of the shoe and on the upper surface thereof is a pair of side lugs 14, and journalled between said lugs and at each end thereof are rollers 15 by which is supported an endless chain or belt 16. Disclosed below the main frame A in front of the driver's seat is a cross shaft 17. This shaft is carried in suitable journal members and turning movement is transmitted thereto by means of a hand lever 18 in one instance, or by means of a crank arm 19 and a link 20 in another instance; connection being formed between the hand lever 18 and the shaft 17 by means of an arm 21, the upper end of which is slotted, as at 22, to receive a pin or other connection carried by the lower end of the lever 18.

There are two crank arms 19, one at each end of the shaft 17; the lower ends of the cranks 19 being connected by the links 20 with the crank arms 7 of the bumper, while the upper ends, indicated at 21, of the crank arms are connected by means of links 23, 24 and 25 with rocker arms 26; said rocker arms being in turn connected with the respective shoes 13 by means of links 27. The crank arms 26 are pivotally attached to brackets 28 and these are in turn supported by semi-elliptical springs 29 secured to each side of the frame as shown; such structure being provided for the purpose of forming a resilient support for the link mechanism generally indicated at 23, 24, 25, etc.

For the purpose of positively depressing the shoe and lowering it to the road surface, during cases of emergency or otherwise, to a point where the rear wheels can run up on the same, a pair of secondary links 29$^a$ are employed. These are pivotally attached at their upper ends to the frame as at 30, and they are connected at their lower ends as at 31, with the respective links 27.

Experience has shown that practically all drivers of motor vehicles encounter accidents or other conditions where it becomes necessary to immediately and quickly arrest the forward movement of the vehicle. The ordinary brake equipment on motor vehicles does not admit of this, because it is more or less essential, first to cut out the motor and then apply the brakes; two operations are therefore necessary, the performance of which requires time and may be fatal, and again, when an emergency arises, the driver of the vehicle is often apt to become confused and throw on the brake before cutting out the motor, in which case the brake not only has to resist the momentum of the vehicle, but the driving force of the motor; the result being that the vehicle cannot be stopped as quickly or within the short distance necessary to meet the emergency. In the present instance I have provided, first, a mechanism which may be manually or automatically operated; second, a brake mechanism which may be employed as a lock when the automobile is standing on a slope or hill, and third, a brake mechanism which may be locked to prevent theft of the car. For instance, if when driving the vehicle and it is desired or necessary to quickly arrest the forward movement of the vehicle, it is accomplished by the driver merely throwing the lever 18 forward into the dotted line position indicated at 18$^a$. This movement of the lever transmits a turning movement to shaft 17. This movement is transmitted by the cranks 21 and the links 23 to the links 24 and 25. These in turn swing the crank arm 26 downwardly, and similarly the links 29$^a$, and as the tubular arm 9 is merely pivotally attached to the brake drum, it can be seen that this will swing downwardly and place the shoes in front of the rear driving wheels so that the wheels will run up on the same and thereby cause a braking action which will almost instantly bring the car to a stop. After the vehicle has come to a stop, if it is desired to again raise the brake to inoperative position, as shown in full lines in Fig. 1, it is only necessary to throw the gears in reverse and to back the car off the shoes, when it is again possible to raise the shoes by pulling the lever 18 back to the full line position shown.

Another use of the brake, and when it is automatically actuated, is if a pedestrian or other obstruction should be struck by the bumper 4. In that instance the bumper would swing back to the dotted line position shown at 4$^{a'}$. A forward movement would then be imparted to the rods 20 and a turning movement to shaft 17, said turning movement being transmitted to lower the shoes in front of the rear driving wheels as previously described, so it can readily be seen that if any obstruction is encountered the shoes will be automatically lowered and, practically speaking, bring the car to an instant stop.

Another use of the brake mechanism is that of lowering the shoes in front of the driving wheels and permitting the wheels to climb or ride up on the same when it is desired to park the car on a slope or hill. Such locking or braking of the car is positive and will, under all conditions, prevent the car from running away or accidentally freeing itself as has often happened where ordinary brakes are employed.

A still further use of the brake mechanism is that of locking the car against theft. This is accomplished by lowering the shoes and permitting the rear wheels to rest on the same and then locking the shoes in that position by placing a padlock or like locking mechanism, such as indicated at 40, through the lever 18 and the bracket supporting the same; the bracket and lever being perforated to receive the lock.

Another important feature of the present invention is the fact that the emergency brake mechanism is operable entirely independent of the service brake, emergency brake and the motor of the car. For instance if the driver of a car, under ordinary circumstances, attempts to bring the car to a quick stop, it is accomplished by throwing out the clutch, depressing the foot or service brake, and simultaneously pulling back on the emergency brake. These three operations take time and the brakes are not sufficiently strong to bring the car to as quick a stop as may be necessary. In the present instance it is only necessary to throw the lever 18 forward. The other brakes and the clutch need not be touched in any manner as the motor can continue running even though the clutch is not released. This is due to the fact that each shoe is provided with an endless chain 16 as shown. The rear driving wheels when riding up on the shoes can therefore continue rotating without in any way affecting the braking action of the shoes. It can therefore be seen that it is not necessary to throw out the clutch when employing the emergency brake and when coming to a quick stop; nor is it necessary to operate any of the other brakes mentioned.

To limit the rearward movement of the brake shoes, a lug 32 is formed on the upper end of the tubular arm 9, which engages the axle housing of the rear wheels. Stops may also be employed in connection with the link 29ª if desired, but this is hardly necessary in view of the lug 32 provided.

By referring to Fig. 1, it will be seen that the links 24 and 25 form a more or less important function, that is when the brake is pulled up or raised, links 24 and 25 which are centrally connected will pass beyond a center drawn through their opposite ends. This is of importance as it automatically locks the brake mechanism in raised position and holds it in this position until lever 18 is swung forwardly as previously described. Such movement of the lever forces the links 24 and 25 rearwardly and thus swings them out of the automatic locking position normally assumed.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. The combination with a motor vehicle, of normally elevated brake shoes arranged in cooperative relation with the rear wheels of the vehicle and adapted to engage the road surface, a shaft disposed in advance of the front wheels of the vehicle, double crank arms swingingly connected to the ends of said shaft, a bumper connected to the upper ends of said arms, a transverse shaft disposed in the rear of the front wheels, crank arms secured to this second shaft, links directly connected to the respective arms of said shafts, and means between the arms of said second shaft and the brake shoes for automatically lowering the brake shoes in front of the rear wheels when a blow is imparted to the bumper.

2. The combination with a motor vehicle, of brake shoes disposed in cooperative relation with the rear wheels of the vehicle and adapted to engage the road surface, means to hold the brake shoes normally elevated, a transverse shaft disposed in advance of the front wheels of the vehicle, double crank arms swingingly mounted at the ends of said shaft, a bumper connected to said arms, a transverse shaft journaled on the chassis between the front and rear wheels, double crank arms secured to the ends of said second-mentioned shaft, links directly connecting the lower ends of the respective crank arms of said shafts, the aforesaid brake shoe holding means being located between the second-mentioned shaft and the rear wheels of the vehicle, a means connecting the upper ends of the crank arms of the second shaft with the brake shoes, and manually operable means having connection with said second shaft to turn the latter and thereby lower the brake shoes into engagement with the road surface and whereby in the event of a blow being imparted to the bumper said holding means will be actuated to lower the brake shoes into engagement with the road surface independently of the said manually operable means.

3. The combination with a motor vehicle, of a pair of normally elevated brake shoes disposed in cooperative relation with the driving wheels of a motor vehicle, a bumper at the forward end of the vehicle, means to pivotally support the bumper above the road surface for rocking movement if an obstruction is encountered by the bumper, a transverse rock shaft journaled on the vehicle chassis between the front and rear wheels of the vehicle, crank arms on said shaft, a link on each side of the vehicle having direct connection with the bumper supporting means and with the respective crank arms of said transverse shaft to turn said shaft immediately upon the bumper shifting on its pivotal means incident to contact with an obstruction, and means between said shaft and the brake shoes to lower said brake shoes upon the aforesaid turning movement of the shaft.

PIETRO ARRIGHI.